United States Patent Office 3,220,921
Patented Nov. 30, 1965

3,220,921
BAIT-INSECTICIDE
Sheldon B. Greenbaum, Tonawanda, and Edward D. Weil, Lewiston, N.Y., assignors to Hooker Chemical Corporation, Niagara Falls, N.Y., a corporation of New York
No Drawing. Filed July 24, 1961, Ser. No. 125,935
3 Claims. (Cl. 167—30)

This invention describes a unique bait-insecticidal composition eminently suited for the safe eradication of insects especially in areas such as human dwellings and their environs, farms, food processing plants, and factories.

More specifically, this invention describes a bait-hexachlorocyclopentadiene dimer composition herein called $C_{10}Cl_{12}$, said bait being used for the purpose of inducing insects, particularly the imported fire ant (*Solenopsis saevissima* v. *richterii*) to ingest the poisonous $C_{10}Cl_{12}$, and thereby effecting their demise.

The terms insect and insecticide as used here and throughout this application refer to not only the classical definition of small invertebrate animals having three clearly defined body regions, head, thorax and abdomen, with only three pair of legs, and usually with wings, such as beetles, bugs, bees, flies, mosquitoes and the like, but also encompass other allied classes of arthropods or other invertebrate pests whose members are wingless and usually have greater or fewer than six legs, for example, spiders, ticks, centipedes, wood lice, nematodes and the like. Thus, as used here, the terms "insect" and "insecticide" are intended to conform to the definitions provided by Section 2, subsection *h* of the "Federal Insecticide, Fungicide and Rodenticide Act of 1947" (Public Law 104).

While there is no dearth of insecticides that function through contact toxicity, very few effective and persistent insecticides are available which function as insecticides through the ingestion of toxic residues in the digestive organs of the insect. The mode of action or mechanism by which the insecticide functions is more than of academic interest in those situations where safety and lack of toxic residues rather than high insecticidal activity per se is the prime consideration.

For example, within recent years, particularly in the southern United States, the imported fire ant has become a major insect nuisance for several reasons. This insect which feeds primarily upon other insects, infests croplands, pastures, lawns and other areas contiguous to mammalian dwellings, builds its own home in the form of huge earth mounds in the above-mentioned areas. These mounds interfere with the normal tilling of the soil by farm machinery and thus, cause serious economic loss to the farmer.

In addition, in heavily infested areas, the ants inflict painful and occasionally quite serious stings or bites upon people and domestic pets and animals which are unfortunate enough to come into contact with them. The eradication of this insect is a problem upon which little headway as yet has been made.

The obvious method of controlling this type of pest is to saturate the infested area by spraying or broadcasting a potent contact insecticide. Unfortunately, while this method is moderately successful against the imported fire ant and other insects, because of the moderate-to-high mammalian toxicity of the more effective contact insecticides, problems of acute or chronic toxicity are encountered. Furthermore, since all non-volatile insecticides leave residues after application, the insecticides having high or moderately high mammalian toxicity cannot be used on crops, around dairy cattle, livestock being raised for meat, or on foods generally, since they will generally leave some toxic residue on the food product. The food and agricultural laws allow no toxic residues whatsoever in milk and meat, and only small residues are generally tolerated on other foods. Thus, safe, practical insecticidal compositions with good persistance were not available for the control of the fire ant or other insects in situations where toxic residues could not be tolerated such as the aforementioned food products and in areas such as game preserves, household environs and the like.

The applicants had found unexpectedly that the $C_{10}Cl_{12}(C_5Cl_6$ dimer), which was known to possess weak contact insecticide activity had a much more pronounced toxicity when ingested in the insects' digestive tract. Perhaps even more surprising, it has been found that this highly chlorinated substance, $C_{10}Cl_{12}$ has almost no irritating effect on the mucous membranes of mammals and the unusually low acute mammalian toxicity of six thousand mg./kg. as measured orally in rats. Thus, this material incorporated in a proper bait allows the selective effective eradication of insects without danger to mammalian life.

These characteristics of the inventive bait-$C_{10}Cl_{12}(C_5Cl_6$ dimer), compositions are especially advantageous in the household area where crawling insects such as ordinary ants, silverfish and cockroaches are encountered. Here the proper choice of bait will allow the insect to be attracted to the $C_{10}Cl_{12}$ composition which in itself is comparatively non-toxic to children, pets and animals and other mammals. Another advantage of the insecticidal compositions of this invention is the $C_{10}Cl_{12}$ component's insect toxicity apparently is undiminished even though it remains for long periods of time at room temperatures.

In all of the above described uses the two prerequisites are (1) low mammalian toxicity and high insecticidal toxicity upon ingestion and (2) a class of substances called baits which will incorporate the insecticide in a form peculiarly or particularly attractive to the insects to be destroyed. By baits is meant any substance which will entice, induce, compel or otherwise cause the insect to ingest the insecticidal composition no matter by what physiological mechanism the substance (bait) functions. Therefore, any substance which will entice, induce, compel or otherwise cause the insect to eat the insecticidal composition through appeal to its sense of taste, smell, sight or touch, would be within the meaning and intent of the insecticidal compositions of this invention.

Suitable baits include alfalfa meal, beef fat, blood meal, bacon, beef bouillon, corn meal, casein, corn, cotton seed meal, chicken feed, dog food, dried apple, egg, fish meal, flour, honey, meat, oats, peanuts, peanut butter, peanut meal, raisins, sausage, sawdust, sugar, soybean meal, tankage, wheat, bran, whey, cattle feed, bread, crackers, St. Johns bread, chocolate, dog biscuits, packing house wastes, grain, seeds, butter, bacon drippings, corn oil, soft drink syrup, cotton seed oil, lard, chocolate syrup, molasses, sugar syrup, peanut oil, vegetable oil, corn protein hydrolysate, soups and bouillons, mayonnaise, milk and cream and aromatic natural oils.

In its composition aspect, this invention consists of a composition containing an insecticidal concentration of the $C_{10}Cl_{12}(C_5Cl_6$ dimer) incorporated in the appropriate bait.

For example, the preferred composition for controlling the imported fire ant will be peanut butter containing from 0.01 to six percent by weight of the $C_{10}Cl_{12}$ insecticide as toxicant.

The ordinary household ants prefer sugar and other sugar-containing materials of this nature and for ant control this is the preferred composition.

Cockroaches, being relatively omnivorous, will be attracted to most of the listed illustrative baits and the choice of baits is not critical.

Where the identity of the insect or insects is not known a mixture of several different types of baits would be most judicious until the preference of the species is determined.

The concentration of the toxicant in the bait is ordinarily in the range of 0.01 percent up to fifty percent by weight, with the best acceptance of the bait by the insect being in the range of 0.01 to six percent.

The general method of using the bait is to distribute the bait, divided into small volumes, in the area frequented by the insects.

The formulations may also contain odorants which are added to make the compositions especially attractive to insects. They may also contain pigments or odorants to serve to distinguish the baits from human food substances. They may contain odorants which discourage or are repellent to mammals, so as to prevent the baits from being consumed by pets and children and rodents, etc. Finally, these formulations may contain spoilage retardants such as anti-oxidants, fungistats, and bacteriostats, or other related substances for special situations and uses.

The formulations may be applied without container, or in perforated containers of paper, plastic, metal and the like.

The synthesis of the known hexachlorocyclopentadiene ($C_5Cl_5$) dimer herein called $C_{10}Cl_{12}$ is given at some length in recently issued S.N. 518,340, filed June 27, 1955, now U.S. Patent No. 2,996,553, in the United States Patent Office. This material is a white crystalline substance melting at four hundred and eighty-three to four hundred and eighty-seven degrees centigrade, whose most likely structure is presently believed to be:

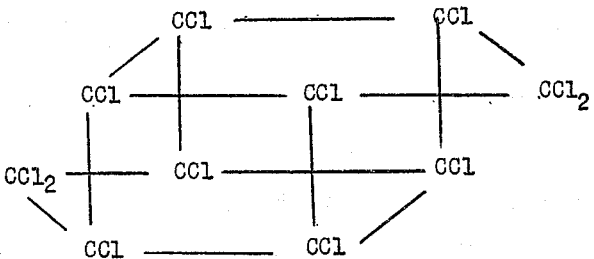

The following examples are intended to further illustrate various facets of this invention but are in no way, manner, or form to be construed as limiting the scope of this invention except as set forth in the specification and claims.

*Example 1*

A mixture of $C_{10}Cl_{12}(C_5Cl_5$ dimer) melting at four hundred and eighty-three to four hundred and eighty-seven degrees centigrade, prepared as disclosed in SN 518,340, is thoroughly admixed to an 0.1 percent by weight concentration in peanut butter. This bait-$C_{10}Cl_{12}$ formulation is divided into small pieces and distributed on the ground in an area infested with the imported fire ant (*Solenopsis saevissima* var. *richterii*). The nests to which the bait is carried by worker ants of this species are kept under observation. After approximately two months, the ant colonies are found to be eradicated.

*Example 2*

$C_{10}Cl_{12}(C_5Cl_6$ dimer) is admixed with cracker meal so that the resultant bait-insecticide composition contains 0.2 percent by weight $C_{10}Cl_{12}$. The insecticidal formulation in small amounts is scattered around exposed damp warm plumbing fixtures and pipes in a dwelling infested with silverfish and cockroaches. After three days, the silverfish population was eradicated while a notable reduction of the cockroaches took place in one week.

*Example 3*

$C_{10}Cl_{12}(C_5Cl_6$ dimer) is combined with corn syrup so that a final concentration by weight of five percent $C_{10}Cl_{12}$ results. The sticky formulation is placed proximate to a known household ant colony. Complete destruction of the colony is observed within one month.

We claim:
1. A method for controlling ants comprising the application of a bait-$C_{10}Cl_{12}(C_5Cl_6$ dimer) formulation, wherein the $C_{10}Cl_{12}(C_5Cl_6$ dimer) is present in insecticidal concentration to the locus of the ants to be controlled.
2. A method for controlling the imported fire ant comprising the application of a peanut button-$C_{10}Cl_{12}(C_5Cl_6$ dimer) formulation wherein the $C_{10}Cl_{12}(C_5Cl_6$ dimer) is present in insecticidal concentration to the locus of the imported fire ant.
3. The method of claim 1 in which the bait is peanut butter.

References Cited by the Examiner

UNITED STATES PATENTS

| Re. 24,750 | 12/1959 | Gilbert | 167—30 |
| 2,811,479 | 10/1957 | Geary | 167—48 |
| 2,821,500 | 1/1958 | Jackson et al. | 167—48 |
| 2,996,553 | 8/1961 | Johnson | 260—648 |

OTHER REFERENCES

"Pest Control," February 1952, page 24.

JULIAN S. LEVITT, *Primary Examiner.*

MORRIS O. WOLK, LEWIS GOTTS, *Examiners.*